United States Patent
Govindassamy et al.

(10) Patent No.: US 9,763,187 B1
(45) Date of Patent: Sep. 12, 2017

(54) METHOD AND APPARATUS FOR POWER SAVING IN CLIENT TERMINALS

(71) Applicant: MBIT WIRELESS, INC., Irvine, CA (US)

(72) Inventors: Sivakumar Govindassamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/251,254

(22) Filed: Aug. 30, 2016

Related U.S. Application Data

(62) Division of application No. 14/707,390, filed on May 8, 2015, now Pat. No. 9,462,548.

(51) Int. Cl.
| | |
|---|---|
| *H04B 7/00* | (2006.01) |
| *H04W 52/02* | (2009.01) |
| *H04W 72/04* | (2009.01) |
| *H04W 36/04* | (2009.01) |
| *H04W 36/06* | (2009.01) |
| *H04L 27/26* | (2006.01) |
| *H04W 88/08* | (2009.01) |

(52) U.S. Cl.
CPC ......... *H04W 52/0209* (2013.01); *H04L 27/26* (2013.01); *H04W 36/04* (2013.01); *H04W 36/06* (2013.01); *H04W 72/042* (2013.01); *H04W 72/0446* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2006/0166693 A1* | 7/2006 | Jeong | .................... | H04W 48/16 455/525 |
| 2007/0260851 A1* | 11/2007 | Taha | ................. | H04W 52/0229 712/204 |
| 2011/0117912 A1* | 5/2011 | Mahajan | ............... | H04W 48/12 455/434 |
| 2012/0322446 A1 | 12/2012 | Ramachandran et al. | | |
| 2014/0334372 A1 | 11/2014 | Vos | | |

* cited by examiner

*Primary Examiner* — Edan Orgad
*Assistant Examiner* — Sithu Ko
(74) *Attorney, Agent, or Firm* — Lerner, David, Littenberg, Krumholz & Mentlik, LLP

(57) ABSTRACT

In any cellular communication the network transmits broadcast information with some periodicity which is defined by the network parameters. The client terminal must acquire this system information in order to access the services from the network. The time required by the client terminal to acquire all the necessary system information to initiate network access may depend on the scheduling of the system information broadcast by the network. In some cases the scheduling information about the system information may be described in another system information message whose schedule may be fixed or known a priori. Conventional method of decoding the complete system information may involve decoding attempt for all the possible instances of transmission of the system information. A method and apparatus are disclosed that enables acquisition of the system information based on stored known instances of system information transmission. This results in reduced power consumption at the client terminal.

6 Claims, 11 Drawing Sheets

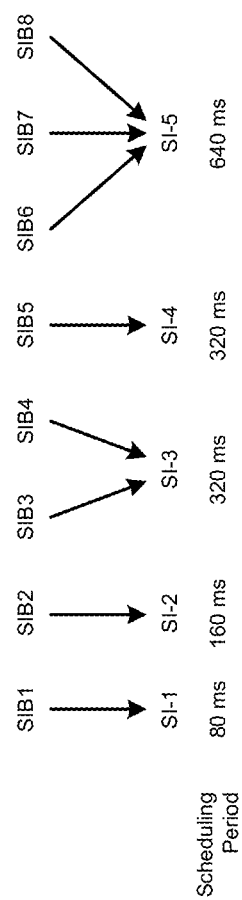

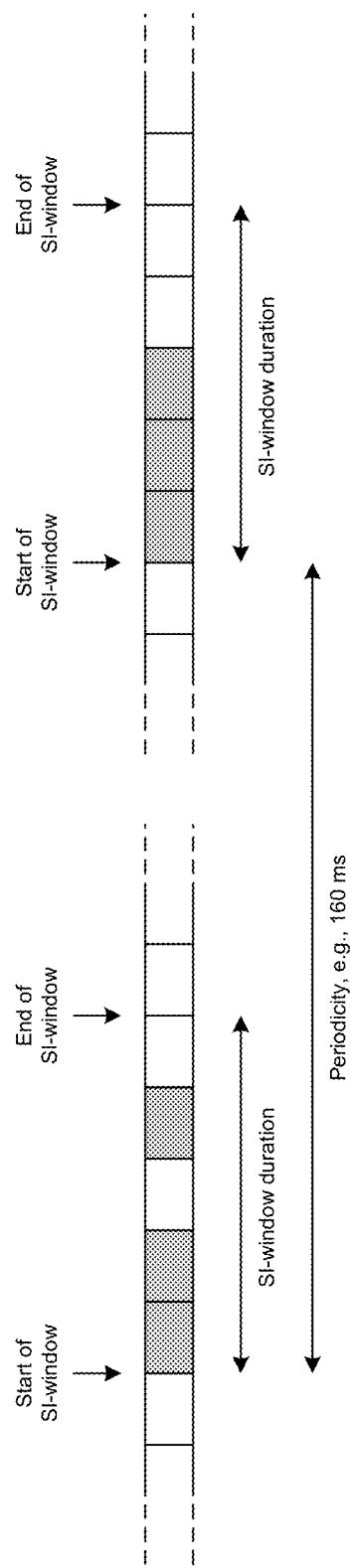

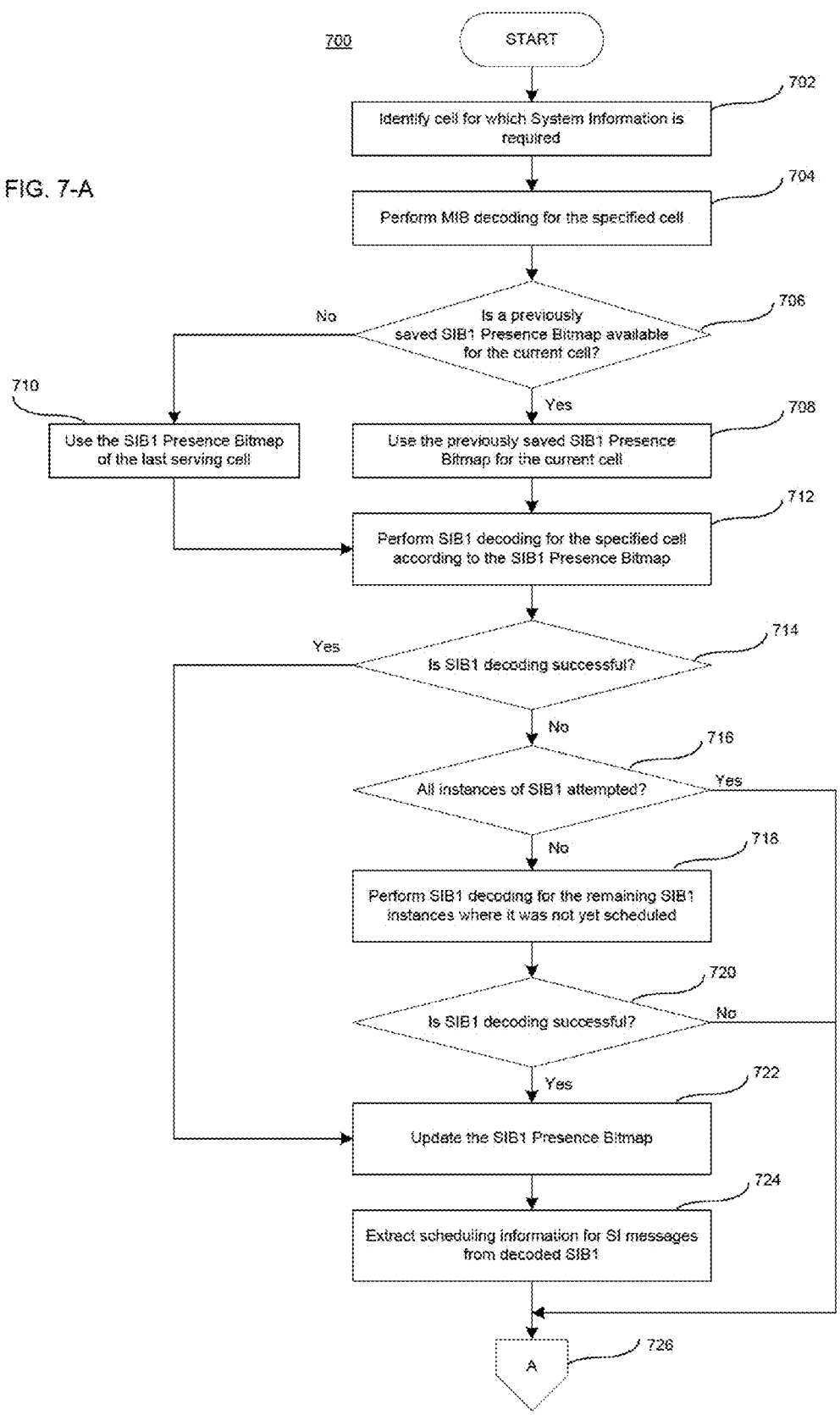
FIG. 7-A

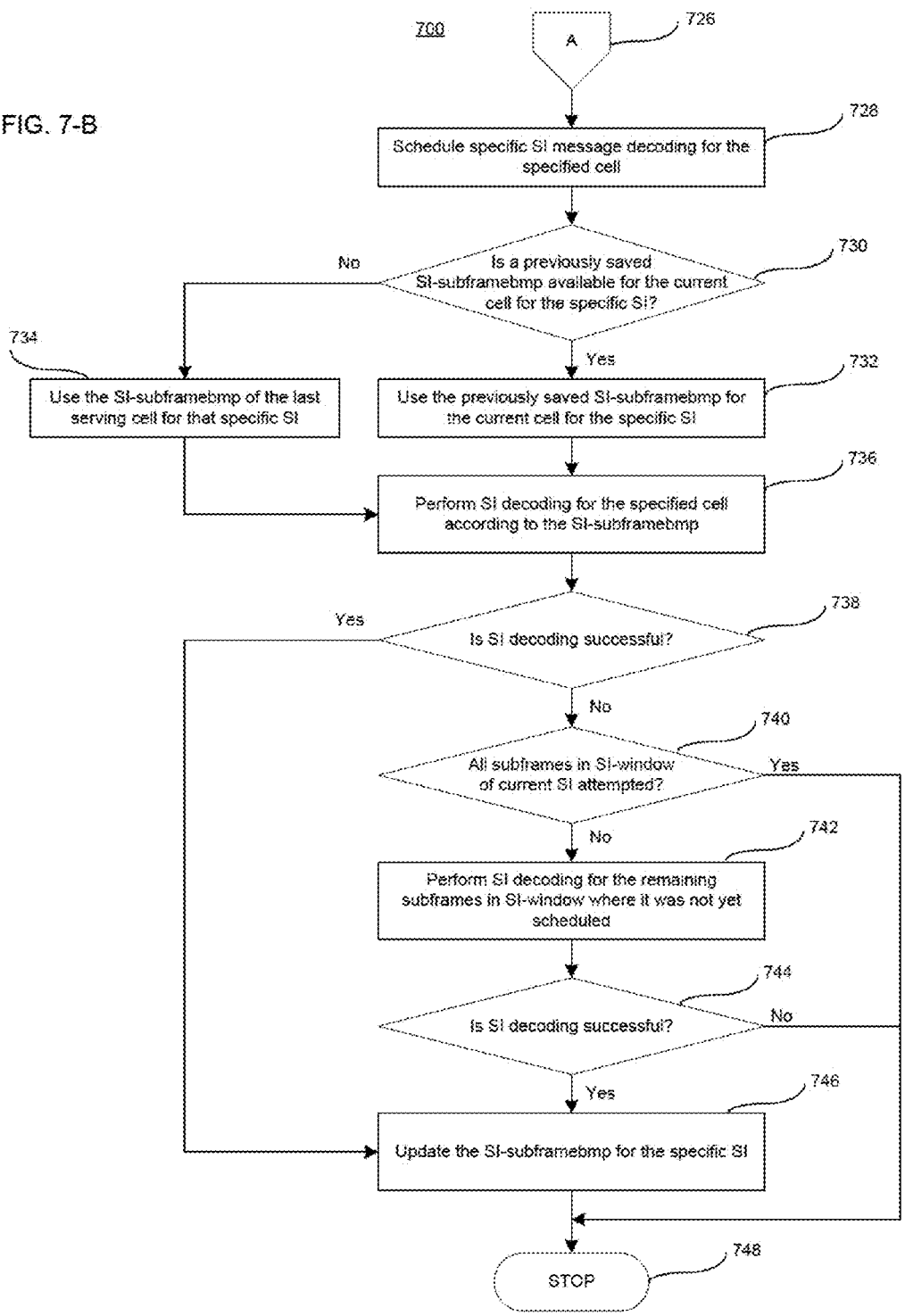

METHOD AND APPARATUS FOR POWER SAVING IN CLIENT TERMINALS

CROSS REFERENCE TO RELATED APPLICATIONS

The present application is a divisional of U.S. patent application Ser. No. 14/707,390, filed on May 8, 2015, the disclosure of which is incorporated herein by reference.

As shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station to which the client terminal is communicating with is referred as the serving base station. In some wireless communication systems the serving base station is normally referred as the serving cell. The terms base station and a cell may be used interchangeably herein. In general, the cells that are in the vicinity of the serving cell are called neighbor cells. Similarly, in some wireless communication systems a neighbor base station is normally referred as a neighbor cell.

The 3GPP LTE wireless communication system air interface is organized into radio frames, subframes, and Orthogonal Frequency Division Multiplexing (OFDM) symbols as shown in FIG. 2. Each radio frame comprises ten subframes numbered from subframe 0 to subframe 9. The radio frame duration is 10 ms and the subframe duration is 1 ms. In 3GPP LTE wireless communication system, a BS is referred to as evolved NodeB (eNB).

As per 3GPP LTE wireless communication system specifications, each cell broadcasts the access information about the system which is required for the client terminals to receive service. The system information is organized into the MasterInformationBlock (MIB) and a number of SystemInformationBlocks (SIBs). The MIB includes a limited number of essential parameters that are required to acquire other system information from a cell.

As per 3GPP LTE wireless communication system specifications, the MIB is transmitted on the Physical Broadcast Channel (PBCH) in subframe 0 as shown in FIG. 2. The MIB uses a fixed schedule with a periodicity of 40 ms and repetitions made within 40 ms. The first transmission of the MIB is scheduled in subframe #0 of radio frames for which the system frame number (SFN) mod 4=0, and repetitions are scheduled in subframe #0 of all other radio frames within the 40 ms window. An example of this is shown in FIG. 3.

As per 3GPP LTE wireless communication system specifications, the SIB1 is transmitted on a fixed schedule over the Physical Downlink Shared Channel (PDSCH) with a periodicity of 80 ms and repetitions made within each 80 ms window. The first transmission of SIB1 may be scheduled in subframe #5 of radio frames for which the SFN mod 8=0, and repetitions are scheduled in subframe #5 of all other radio frames for which SFN mod 2=0. An example of this is shown in FIG. 4.

As per 3GPP LTE wireless communication system specifications, the SIBs other than SIB1 are transmitted in SystemInformation (SI) messages and mapping of SIBs to SI messages is flexibly configurable by the Information Element (IE) SchedulingInformation included in the SIB 1. Each SIB must be contained only in a single SI message. Only SIBs having the same scheduling requirement (periodicity) can be mapped to the same SI message. The SIB2 is always mapped to the SI message that corresponds to the first entry in the list of SI messages in SchedulingInformation. There may be multiple SI messages transmitted with the same periodicity. SIB1 and all SI messages are transmitted on PDSCH. An example of the mapping of SIBs to SI messages is shown in FIG. 5.

As per 3GPP LTE wireless communication system specifications, the SI messages are transmitted within periodically occurring time window, referred to as SI-window, using dynamic scheduling. Each SI message is associated with an SI-window and the SI-window of different SI messages do not overlap, i.e., within one SI-window only the corresponding SI is transmitted. The length of the SI-window is common for all SI messages, and is configurable. Within the SI-window, the corresponding SI message may be transmitted a number of times in any subframe other than Multicast-Broadcast Single Frequency Network (MBSFN) subframes, uplink subframes in TDD, and subframe #5 of radio frames for which SFN mod 2=0. The client terminal acquires the detailed time-domain scheduling from decoding SIB1 which configures the SI-window length and the transmission periodicity for the SI messages. An example of the mapping of the SI messages to SI-windows is shown in FIG. 6. Each rectangular box in FIG. 6 represents one subframe. The shaded boxes are used to indicate the subframes that are used for scheduling SI messages within an SI-window.

As per 3GPP LTE wireless communication system specifications, the SI messages may be transmitted in the SI-window using dynamic scheduling by the eNB. The SI messages may be transmitted in all subframes in SI-window or the SI messages may be transmitted in some subframes in the SI-window. The eNB may have different SI message transmission scheduling in each SI-window for different SI messages.

Conventional methods depend on successfully decoding the SIB1 first to acquire the detailed time-domain scheduling information for other SI messages, e.g. frequency-domain scheduling, used transport format before decoding other SIs and attempt to decode SI in all subframes in SI-Window.

BRIEF SUMMARY

In accordance with an aspect of the present invention, a method for decoding system information may include determining, by a processing device, whether a system information block (SIB) Presence Bitmap for a currently selected base station is stored in a memory of a wireless communication device associated with the processing device; and controlling, by the processing device, SIB decoding for the currently selected base station according to either a SIB Presence Bitmap of a last serving base station or the SIB Presence Bitmap for the currently selected base station stored in the memory selected as a selected SIB Presence Bitmap, based on a result of the determining whether the SIB Presence Bitmap is in the memory.

In one alternative, the SIB decoding is performed for radio frames and subframes according to the selected SIB Presence Bitmap.

In one alternative, the method may further include determining, by the processing device, whether the SIB decoding is successful; and wherein, when the decoding is determined to be successful, updating, by the processing device, the SIB Presence Bitmap for the currently selected base station stored in the memory according to detection and decoding status in radio frames and subframes in which a SIB was transmitted by the currently selected base station.

In one alternative, the method may further include, when the SIB decoding is determined to be unsuccessful, determining, by the processing device, whether SIB decoding was attempted for all instances of the SIB within a SIB periodicity.

In one alternative, the method may further include, when the SIB decoding for the all instances of the SIB is determined to have been attempted, controlling, by the processing device, decoding a SI message for the currently selected base station according to scheduling information extracted from the SIB transmitted by the currently selected base station.

In one alternative, the method may further include, when the SIB decoding for the all instances of the SIB is determined not to have been attempted, controlling, by the processing device, SIB decoding for all remaining SIB instances within the SIB periodicity, and after the SIB decoding is performed for the all remaining SIB instances, determining, by the processing device, whether the SIB decoding is successful.

In one alternative, the method may further include, when the SIB decoding is successful after the SIB decoding is performed for the all remaining SIB instances, updating, by the processing device, the SIB Presence Bitmap for the currently selected base station stored in the memory according to detection and decoding status in radio frames and subframes in which the SIB was transmitted by the currently selected base station, extracting from the decoded SIB, by the processing device, scheduling information for SI messages, and controlling, by the processing device, decoding of a specific SI message for the currently selected base station according to the scheduling information.

In one alternative, the method may further include controlling, by the processing device, decoding of a SI message for the currently selected base station according to scheduling information for SI messages extracted from a SIB decoded from the currently selected base station; determining, by the processing device, whether a SI subframe bitmap (subframebmp) for a specific SI message selected for decoding for the currently selected base station is stored in the memory; and controlling, by the processing device, SI message decoding for the specific SI message for the currently selected base station according to a SI subframebmp of the last serving base station or the SI subframebmp for the currently selected base station stored in the memory selected as a selected SI subframebmp, based on a result of the determining whether the SI subframebmp is in the memory.

In one alternative, the SI message decoding of the specific SI message may be performed for radio frames and subframes according to the selected SI subframebmp.

In one alternative, the method may further include: determining, by the processing device, whether the SI message decoding is successful; and wherein, when the SI message decoding is determined to be successful, updating, by the processing device, the SI subframebmp for the specific SI message of the currently selected base station stored in the memory according to detection and decoding status in radio frames and subframes in which the specific SI message was transmitted by the currently selected base station.

In one alternative, the method may further include, when the SI message decoding is determined to be unsuccessful, determining, by the processing device, whether SI message decoding is attempted for all subframe instances of the SI message within an SI window.

In one alternative, the method may further include, when the SI message decoding for the all subframe instances is determined to be not attempted, controlling, by the processing device, SI message decoding for remaining subframe instances within the SI window where the SI message decoding was not attempted, and after the SI message decoding is attempted for the remaining subframe instances, determining, by the processing device, whether the SI message decoding of the specific SI message is successful.

In one alternative, the method may further include, when the SI message decoding is successful after the SI message decoding is attempted for the remaining subframe instances, updating, by the processing device, the SI submframebmp for the specific SI message for the currently selected base station stored in the memory according to detection and decoding status in radio frames and subframes in which the specific SI message was transmitted by the currently selected base station.

In accordance with an aspect of the present invention, an apparatus for decoding system information may include a processing device configured to: determine whether a system information block (SIB) Presence Bitmap for a currently selected base station is stored in a memory of a wireless communication device associated with the processing device; and control SIB decoding for the currently selected base station according to either a SIB Presence Bitmap of a last serving base station or the SIB Presence Bitmap for the currently selected base station stored in the memory selected as a selected SIB Presence Bitmap, based on a result of the determining whether the SIB Presence Bitmap is in the memory.

In one alternative of the apparatus, the processing device may be configured to: determine whether the SIB decoding is successful; and when the decoding is determined to be successful, update the SIB Presence Bitmap for the currently selected base station stored in the memory according to detection and decoding status in radio frames and subframes in which a SIB was transmitted by the currently selected base station.

In one alternative of the apparatus, the processing device may be configured to, when the SIB decoding is determined to be unsuccessful, determine whether SIB decoding was attempted for all instances of the SIB within a SIB periodicity.

In one alternative of the apparatus, the processing device may be configured to: control decoding of a SI message for the currently selected base station according to scheduling information for SI messages extracted from a SIB decoded from the currently selected base station; determine whether a SI subframe bitmap (subframebmp) for a specific SI message selected for decoding for the currently selected base station is stored in the memory; and control SI message decoding for the specific SI message for the currently selected base station according to a SI subframebmp of the last serving base station or the SI subframebmp for the currently selected base station stored in the memory selected as a selected SI subframebmp, based on a result of the determining whether the SI subframebmp is in the memory.

In accordance with an aspect of the present invention, a method for wireless communication may include controlling, by a processing device, receiving of system information (SI) based on information from a memory about a radio frame and subframe in which another SI is detected at a wireless communication device associated with the processing device a last time when the wireless communication device camped on a base station; and storing in the memory, by the processing device, a system frame number (SFN) in which a system information block (SIB) of the another SI is detected for the base station.

In one alternative, the method for wireless communication may include, when the processing device performs selection of, reselection of or handover to another base station and the memory indicates at least one system frame number (SFN) in which the wireless communication device detected a system information block (SIB) when the wireless communication device previously camped on the another base station, the processing device controls decoding of the SIB only in the at least one SFN. In a further alternative, the at least one SFN is stored as a Presence Bitmap for the another base station In one alternative, the method for wireless communication may include, when the processing device performs selection of, reselection of or handover to another base station and a system frame number (SFN) in which the wireless communication device detected a system information block (SIB) for the another base station is not indicated in the memory, the processing device controls decoding of the SIB for the another base station in a plurality of SFNs for a most recent base station served by the wireless communication device indicated in the memory as a Presence Bitmap.

In one alternative of the method for wireless communication, the processing device may control turning off at least one subsystem of the wireless communication device for a subframe in a system frame number (SFN) other than a SFN indicated in the memory in which the wireless communication device is to decode a system information block (SIB). In a further alternative, the subframe in the system frame number (SFN) other than the SFN in which the wireless communication device is to decode the system information block (SIB) is indicated in the memory as a Presence Bitmap.

In one alternative, the method for wireless communication may include, when the processing device performs selection of, reselection of or handover to another base station and the memory indicates a bit map SI-subframebmp for at least one SI message detected in a previous camp on by the wireless communication device, the processing device controls decoding of another SI message in at least one subframe corresponding to at least one bit set in the SI-subframebmp for the SI-window for the another SI message.

In one alternative of the method for wireless communication, the processing device may control turning off at least one subsystem of the wireless communication device for at least one subframe corresponding to at least one bit in a SI window not set in a SI-subframebmp indicated in the memory in which decoding of an SI message by the processing device is not controlled.

In one alternative of the method for wireless communication, the system information block (SIB) of the another SI is detected for the base station based on a Physical Downlink Control Channel (PDCCH) with a System Information-Radio Network Temporary Identifier (SI-RNTI).

In one alternative, the method for wireless communication may include, when decoding by the processing device of a system information block (SIB) for another base station in a system frame number (SFN) of a plurality of SFNs for the another base station, the plurality of SFNs being stored in the memory as a Presence Bitmap for the another base station, is not successful, the processing device controls based on the Presence Bitmap decoding of the SIB in each of the plurality of SFNs for which decoding of the SIB was not attempted until the decoding of the SIB is successful.

In one alternative, the method for wireless communication may include, when a system frame number (SFN) in which the wireless communication device detected a system information block (SIB) for any base station other than a base station being served by the wireless communication device is not indicated in the memory and decoding by the processing device of the SIB using a plurality of system frame number (SFNs) for the base station being served indicated in a Presence Bitmap in the memory is not successful, the processing device controls decoding of the SIB in a plurality of SFNs in which the SIB may be present.

In one alternative, the method for wireless communication may include, when a system information (SI) message is received for another base station by the processing device, the processing devices controls storing in the memory of a subframe number in a system information window in which the processing device detects the SI message based on successful decoding of a Physical Downlink Control Channel (PDCCH) with a System Information-Radio Network Temporary Identifier (SI-RNTI).

In one alternative, the method for wireless communication may include, when a system information (SI) message is detected by the processing device in a system information window, the processing device controls storing of subframe number information in the SI-window in a bitmap format. In a further alternative, in the bitmap format, SI-subframebmp $bit_0$ represents 0th subframe in the SI-window and $bit_n$ represents nth subframe in the SI-window. In still a further alternative, the SI-subframebmp is maintained separately for each SI message.

In one alternative, the method for wireless communication may include, when decoding by the processing device of a SI message for another base station in subframes according to a SI-subframebmp of a SI-window indicated in the memory is not successful, the processing device controls decoding of the SI message in all subframes in the SI-window.

In one alternative, the method for wireless communication may include, when subframe information in a SI-subframebmp for a SI message for another base station is not indicated in the memory, the processing device controls decoding of the SI message using a SI-subframebmp of a last base station served by the wireless communication device indicated in the memory.

In accordance with an aspect of the present invention, an apparatus for wireless communication may include a processing device configured to control: receiving of system information (SI) based on information from a memory about a radio frame and subframe in which another SI is detected at a wireless communication device associated with the processing device a last time when the wireless communication device camped on a base station; and storing in the memory of a system frame number (SFN) in which a system information block (SIB) of the another SI is detected for the base station.

BRIEF DESCRIPTION OF THE DRAWINGS

FIG. 5 illustrates an example mapping of the different SIBs to SI messages with different periodicity in 3GPP LTE wireless communication system.

FIG. 6 illustrates an example mapping of the SI messages to SI-windows with different dynamic scheduling within the windows in 3GPP LTE wireless communication system.

FIGS. 7-A and 7-B illustrate an example flow diagram for processing steps according to aspects of the present invention.

DETAILED DESCRIPTION

Figure 1:
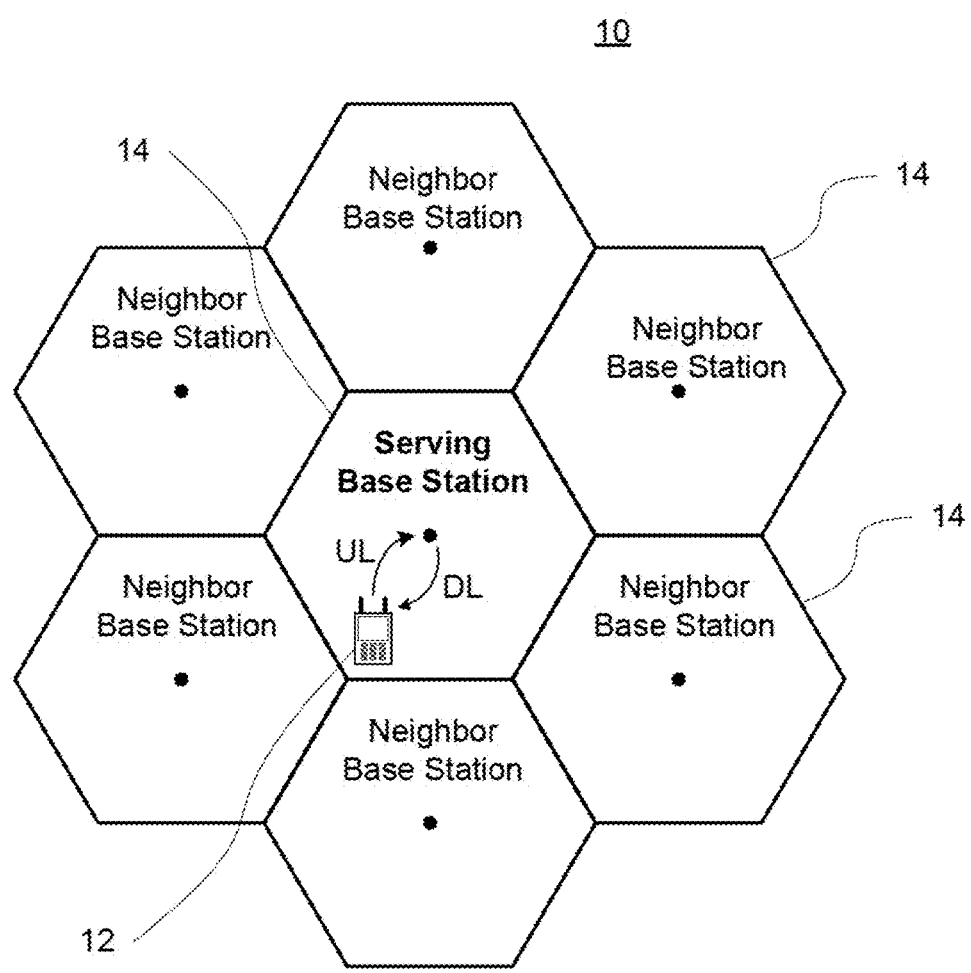
FIG. 1 illustrates a conventional mobile wireless communication system.
Figure 2:
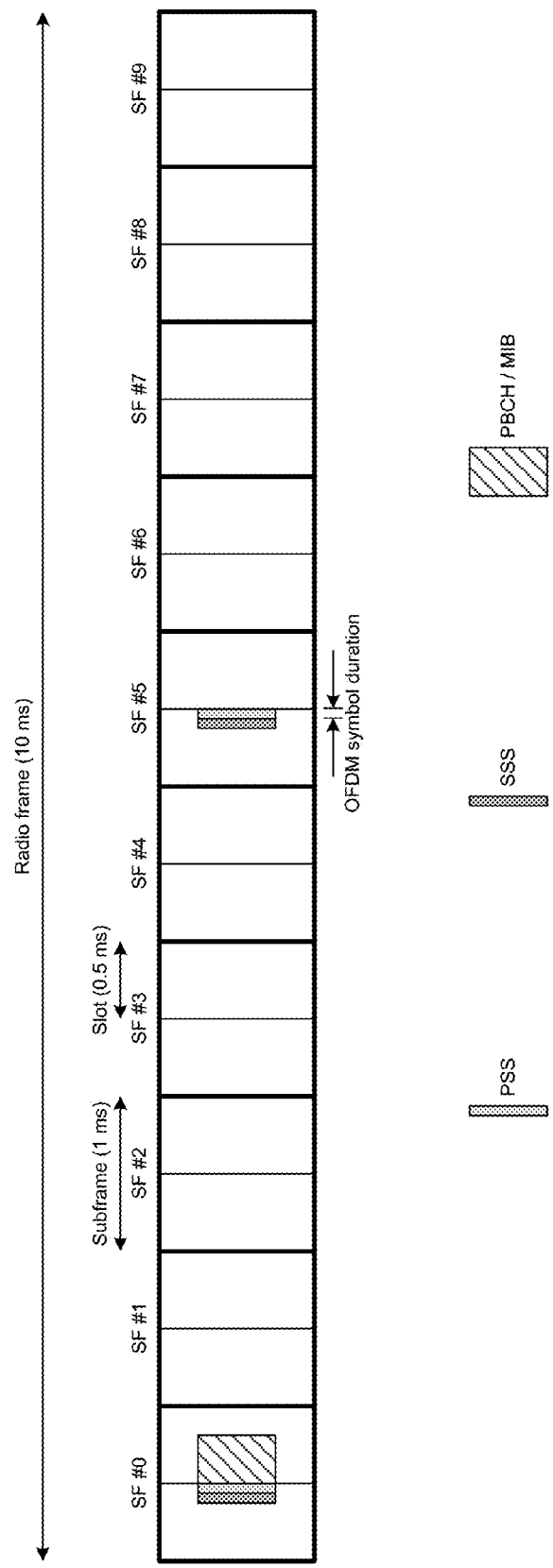
FIG. 2 illustrates the high level air-interface structure of the 3GPP LTE wireless communication system.
Figure 3:
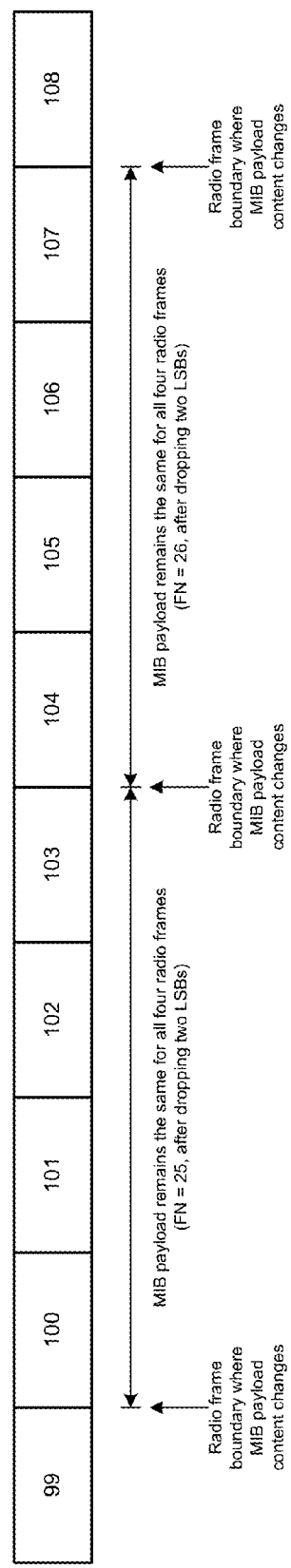
FIG. 3 illustrates an example mapping of the MIB to the radio frames in 3GPP LTE wireless communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used As per the 3GPP LTE wireless communication system specifications, when acquiring an SI message, the client terminal shall:
determine the start of the SI-window for the concerned SI message as follows:
for the concerned SI message, determine the number n which corresponds to the order of entry in the list of SI messages configured by SchedulingInformation IE in the SIB1;
determine the integer value x=(n−1)*w, where w is the si-WindowLength;
the SI-window starts at the subframe #a, where a=x mod 10, in the radio frame for which SFN mod T=FLOOR(x/10), where T is the si-Periodicity of the concerned SI message and FLOOR( ) is defined as a function that rounds its argument to the nearest integer towards negative infinity;
The SI-window length field in the SIB1 is defined as having one the following values: 1, 2, 5, 10, 15, 20, and 40 ms.

As per the 3GPP LTE wireless communication system specifications, a Radio Network Temporary Identifier (RNTI) is used for identifying different UEs (User Equipment) and various other types of information. The SI-RNTI is used for identifying the PDSCH that carries the SI payload. The presence of PDSCH that contains the SIB1 or other SI messages is indicated by the Physical Downlink Control Channel (PDCCH). If a PDCCH is decoded with the identifier SI-RNTI, it is an indication that a PDSCH carrying the SIB1 or SI payload is present in the subframe in which the PDCCH with SI-RNTI is decoded. The PDSCH decoding in that subframe may be successful or not. If the PDSCH decoding is not successful, the client terminal may save the channel soft bits (also known as log likelihood ratios) for combining with future repetitions or retransmissions of the same payload.

The 3GPP LTE wireless communication system uses Hybrid Automatic Repeat Request (HARD) with Incremental Redundancy. The Initial transmission of a block of data and the subsequent retransmissions may use different Redundancy Versions (RV) for improved decoding performance. The RV of the transmissions is indicated by the network in the PDCCH. For the case of SI message transmission, repeated transmissions are used without any ACK/NACK to achieve the benefit of combining over multiple transmissions. The RV of each SI transmission may be indicated explicitly by the network in the PDCCH or may be derived implicitly by the client terminal as follows.

As per 3GPP LTE wireless communication system specifications, the RV of the received downlink assignment for a particular subframe is determined by:

$$RV_K = \text{ceiling}(3/2 * k) \text{ modulo } 4$$

where k depends on the type of system information message. For SIB1 message, $$k = (SFN/2) \text{ modulo } 4$$

For other SI messages, $$k = i \text{ modulo } 4, i = 0, 1, \ldots, n_s^w - 1,$$

where i denotes the subframe number within the SI window $n_s^w$.

When the client terminal performs cell selection, cell reselection or handover i.e., in general when transitioning from one eNB to another eNB, it performs time synchronization with the target eNB and decodes the MIB. Once the MIB is decoded, the client terminal may synchronize the client terminal radio frame number and timing to that of the target eNB. Once the client terminal decodes and derives the radio frame number from the MIB, it maintains the radio frame number by incrementing the radio frame number modulo 1024 since the frame number is defined to be a 10-bit number.

Figure 4:
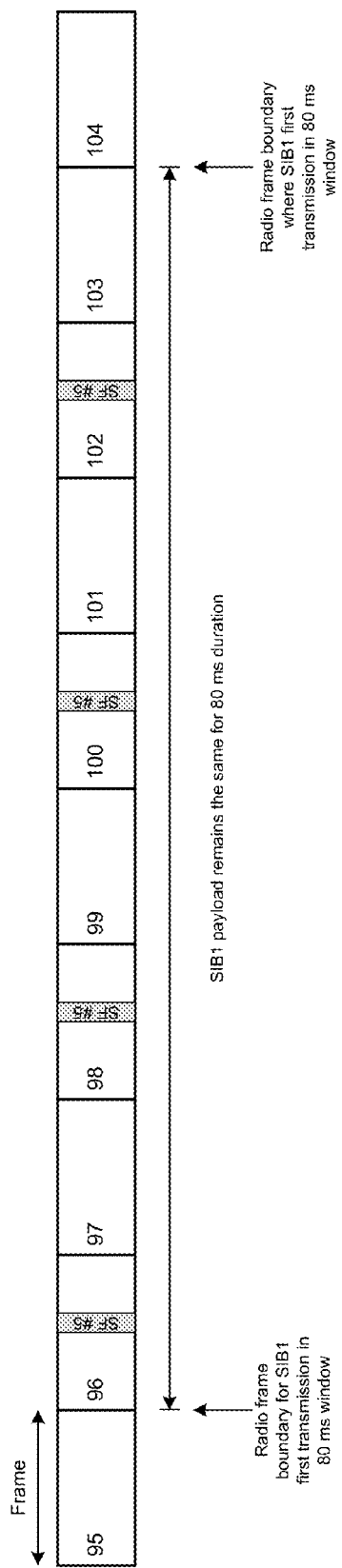
FIG. 4 illustrates an example mapping of the SIB 1 to the radio frames in 3GPP LTE wireless communication system.

Based on the 3GPP LTE wireless communication system specifications, the SIB1 decoding may be attempted in all the defined periodicity for SIB1 which is a fixed schedule with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0. An example of this is shown in FIG. 4.

The eNB may transmit the SIB1 in subframe #5 of all radio frames for which SFN mod 2=0. The eNB may transmit the SIB1 in subframe #5 of some radio frame for which SFN mod 2=0, but may transmit at least one SIB1 within 80 ms.

According to an aspect of the present invention, when the client terminal detects SIB1 is scheduled for a given cell (based on PDCCH with SI-RNTI), it may store the SFN in which it has detected the SIB1 transmission. The SFN for SIB1 presence may be SFN mod 8=0 and/or SFN mod 8=2 and/or SFN mod 8=4 and/or SFN mod 8=6 and these SFNs are referred to as P1, P2, P3 and P4 respectively. The eNB may transmit in all four SFNs P1, P2, P3, and P4 or only a subset of them. The client terminal stores the actual SFN instances in which the SIB1 presence is detected for the given cell. This may be stored as a 4-bit bitmap, namely, "SIB1 Presence Bitmap" corresponding to each of the four instances P1, P2, P3 and P4. If an SIB1 is scheduled in P1, the corresponding bit is set regardless of whether the decoding is successful or not. Similarly, if an SIB1 is scheduled in P2, the corresponding bit is set regardless of whether the decoding is successful or not, and so on for P3 and P4.

According to another aspect of the present invention, when the client terminal performs cell selection or cell reselection or handover to a target eNB referred herein as $eNB_{t1}$, if the client terminal has previously visited $eNB_{t1}$ and the client terminal has the stored information of the SFNs in which the client terminal detected SIB1 during the previous camp on the same eNB ($eNB_{t1}$), i.e., previously saved SIB1 Presence Bitmap for that cell is available, then the client terminal may attempt to receive the SIB1 only in the SFNs according to the stored SIB1 Presence Bitmap for the $eNB_{t1}$.

According to another aspect of the present invention, when the client terminal attempts to receive SIB1 in $eNB_{t1}$ based on the stored SIB1 Presence Bitmap and the SIB1 receive operation in $eNB_{t1}$ is not successful, the client terminal may attempt to decode SIB1 in all the SIB1 SFNs where it may be mapped (P1, P2, P3, P4) in $eNB_{t1}$ if the decoding was not already attempted in all four instances based on the saved SIB1 Presence Bitmap.

According to another aspect of the present invention, when the client terminal performs cell selection or cell reselection to an eNB say $eNB_{t2}$, if the client terminal does not have the stored SIB1 Presence Bitmap for the SFNs in which a neighbor cell transmits the SIB1, then the client terminal may attempt to receive the SIB1 in that cell in the SFNs according to the stored SIB1 Presence Bitmap from most recent serving cell.

According to another aspect of the present invention, when the client terminal does not have stored SIB1 Presence Bitmap information for any neighbor cell, and the SIB1 decode attempt using the SIB1 Presence Bitmap SFNs for serving eNB also fails then the client terminal may attempt to receive SIB1 in all the SFNs where SIB1 may be mapped (P1, P2, P3 and P4).

According to an aspect of the present invention, the client terminal may turn off some of its subsystems for the subframe #5 in SIB1 SFNs P1 or P2 or P3 or P4 where the client terminal does not attempt to receive SIB1 as per the stored SIB1 Presence Bitmap and SFN periodicity.

Based on the 3GPP LTE wireless communication system specifications, unlike the SIB1, the SI messages reception may be attempted in all the subframes within the SI-window. Typically the client terminal may attempt to receive SI messages in all the subframes within the SI-window. The present invention provides a method for the client terminal to receive the SI messages based on the stored information about radio frames and subframes in which the client terminal detected the SI messages when the client terminal camped on the eNB last time.

According to an aspect of the present invention, when the client terminal receives SI messages in an eNB, the client terminal may store the subframe numbers in the SI-window in which it detected the SI messages based on successful decoding of PDCCH with SI-RNTI.

According to an aspect of the present invention, when the client terminal detects an SI message in an SI-window, the client terminal may store the subframe number information in the SI-window in a bitmap format, namely, SI-subframebmp. $Bit_0$ may represent the $0^{th}$ subframe in the SI-window and $bit_n$ may represent $n^{th}$ subframe in the SI-window. According to another aspect of the present invention, the SI-subframebmp may be maintained separately for each SI message.

According to another aspect of the present invention, when the client terminal performs cell selection or cell reselection or handover to an a neighbor cell, if the client terminal has previously visited that cell and the client terminal has the stored SI-subframebmp in which the client terminal detected the SI messages during the previous camp on, then the client terminal may attempt to receive the SI messages in the subframes corresponding to the bits set in the SI-subframebmp for the SI-window for the specific SI message.

According to another aspect of the present invention, when the client terminal attempts to receive SI messages for a neighbor cell in subframes according to the stored SI-subframebmp of SI-window and the SI message receive is not successful, the client terminal may attempt to receive SI message in all the subframes in the SI-window.

According to another aspect of the present invention, when the client terminal does not have stored subframe information in SI-subframebmp for the specific SI message for a given neighbor cell, the SI reception using the previously stored SI-subframebmp of the last serving cell may be used.

According to an aspect of the present invention, the client terminal may turn off some of its subsystems for the subframes corresponding to bits in the SI-window which are not set in the SI-subframebmp where the client terminal does not attempt to receive SI messages.

Aspects of the invention to turn off some of the subsystems for subframes, where the client terminal does not attempt to receive SIB1 or SI messages based on stored SIB1 Presence Bitmap or based on stored SI-subframebmp, enable the client terminal to reduce the power consumption significantly, which is very essential for any battery operated device.

The flow diagram 700 contained in FIG. 7-A and FIG. 7-B illustrate an exemplary SIB1 and SI decoding method according to the various aspects of the present invention. The processing relevant to the present invention begins in the processing stage 702 where the cell for which the System Information is required is identified according to the 3GPP LTE wireless communication system specifications. At processing stage 704 the MIB decoding is performed for the selected cell. At processing stage 706 a determination is made whether previously saved SIB1 Presence Bitmap is available for the currently selected cell. If the previously saved SIB1 Presence Bitmap is available for the currently selected cell, at processing stage 708 it is selected for scheduling SIB1 decoding in subsequent steps. If the previously saved SIB1 Presence Bitmap is not available for the currently selected cell, at processing stage 710 SIB1 Presence Bitmap of the last serving cell is selected for scheduling SIB1 decoding in subsequent steps. After completion of processing at stages 708 or 710, the processing continues at stage 712. At processing stage 712 the SIB1 decoding is scheduled for the currently selected cell in the radio frames and subframes according to the SIB1 Presence Bitmap selected in earlier stages. At processing stage 714 a determination is made whether the SIB1 decoding is successful. If the SIB1 decoding is successful, the processing jumps to the processing stage 722 where the SIB1 Presence Bitmap for the currently selected cell is updated according to the detection and decoding status in radio frames and subframes where the SIB1 was transmitted by the eNB. Returning to processing stage 714, if SIB1 decoding is not successful the processing continues at processing stage 716. At processing stage 716 a determination is made whether decoding for all instances of SIB1 within the SIB1 periodicity are attempted or not. If the decoding for all the instances of SIB1 within the SIB1 periodicity are attempted, the processing jumps to the reference point A in 726. If the decoding for all the instances of SIB1 within the SIB1 periodicity are not attempted, the processing continues at processing stage 718 where the SIB1 decoding is scheduled for the remaining SIB1 instances where the SIB1 decoding was not scheduled in processing stage 712. Next at processing stage 720 a determination is made whether the SIB1 decoding is successful or not. If the SIB1 decoding is not successful, the processing jumps to the reference point A in 726. If the SIB1 decoding is successful, the processing moves to the processing stage 722 where the SIB1 Presence Bitmap for the currently selected cell is updated according to the detection and decoding status in radio frames and subframes where the SIB1 was transmitted by the eNB. Next at processing stage 724 the decoded SIB1 is parsed and the scheduling information for the SI messages is extracted. The processing moved to the reference point A in 726.

The flow diagram 700 continues in FIG. 7-B at reference point A in 726. At processing stage 728, the decoding of a specific SI message for the currently selected cell is scheduled according to the scheduling information extracted from the SIB1 for the currently selected cell. At processing stage 730 a determination is made whether a previously saved SI-subframebmp is available for the specific SI message selected for decoding for the currently selected cell. If the previously saved SI-subframebmp is available for the currently selected cell, at processing stage 732 it is selected for scheduling SI message decoding in subsequent steps. If the previously saved SI-subframebmp is not available for the currently selected cell, at processing stage 734, the SI-subframebmp of the last serving cell is selected for scheduling SI message decoding in subsequent steps. After completion of processing at stages 732 or 734, the processing continues at stage 736. At processing stage 736 the specific SI message decoding is scheduled for the currently selected cell in the radio frames and subframes according to the selected SI-subframebmp selected in earlier stages. At processing stage 738 a determination is made whether the specific SI message decoding is successful. If the specific SI message decoding is successful, the processing jumps to the processing stage 746 where the SI-subframebmp for the specific SI message of the currently selected cell is updated according to the detection and decoding status in radio frames and subframes where the specific SI message was transmitted by the eNB. Returning to processing stage 738, if specific SI message decoding is not successful the processing continues at processing stage 740. At processing stage 740 a determination is made whether all instances of the specific SI message within the SI-window are attempted or not. If all the instances of the specific SI message within the SI-window are attempted, the processing jumps to the stage 748 where the processing for decoding the specific SI message terminates. If all the instances of the specific SI message within the SI-window are not attempted, the processing continues at processing stage 742 where the specific SI message decoding is scheduled for the remaining SI message instances where the specific SI message decoding was not scheduled in processing stage 736. In an alternative embodiment, at processing stage 742 the specific SI message decoding is performed for the remaining SI message instances where the specific SI message decoding was not scheduled in processing stage 736, until a determination is made that the specific SI message decoding is successful. Next at processing stage 744 a determination is made whether the specific SI message decoding is successful or not. If the specific SI message decoding is not successful, the processing jumps to stage 748 where the processing for decoding the specific SI message terminates. If the specific SI message decoding is successful, the processing moves to the processing stage 746 where the SI-subframebmp for the specific SI message for the currently selected cell is updated according to the decoding status in radio frames and subframes where the specific SI message was transmitted by the eNB. Finally, the processing for specific SI message decoding terminates at stage 748.

Note that the processing for decoding additional SI messages, if present, is identical to the processing from processing stages 728 to 748. According to the aspects of the present invention, the SI-subframebmp is maintained separately for each of the SI messages present in the currently selected cell. The processing for decoding of the different SI messages of the selected cell may be performed in parallel or sequentially.

By way of example only, the above-described method may be implemented in a receiver, e.g., a user device such as a wireless mobile station (MS) 12 as shown in FIG. 1.

Figure 8:
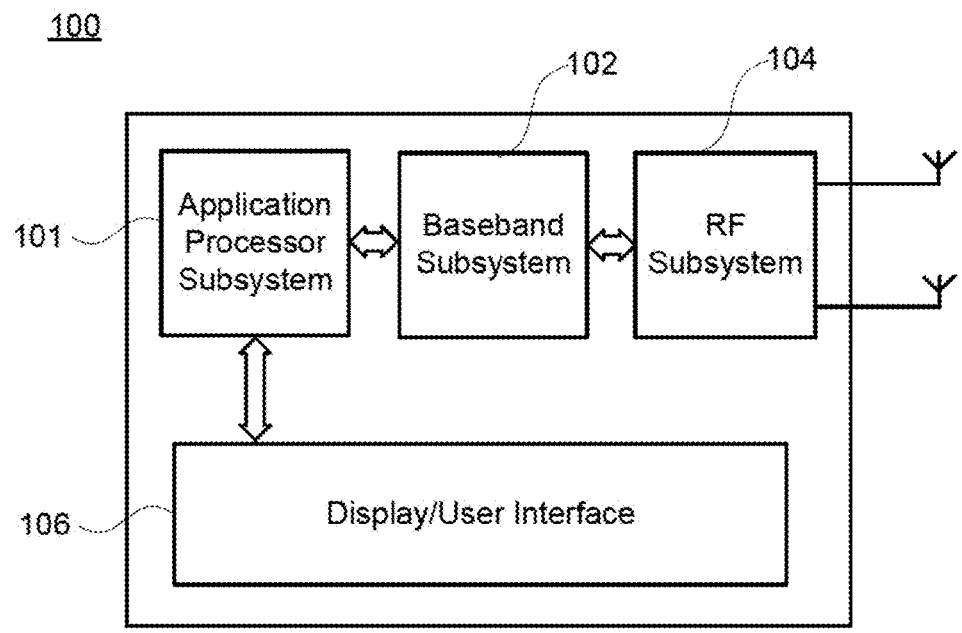
FIG. 8 illustrates a wireless mobile station diagram, which may be employed with aspects of the invention described herein.

As shown in FIG. 8, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 9:
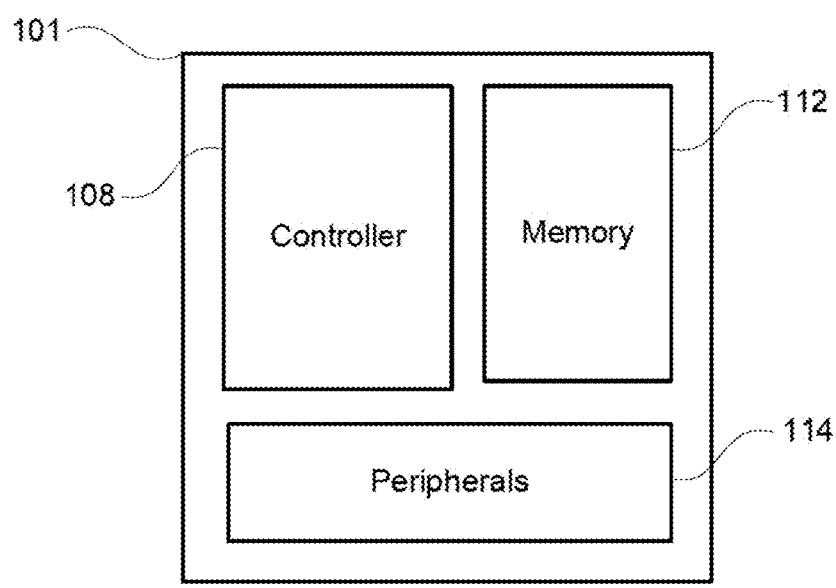
FIG. 9 illustrates an application processor subsystem for a wireless mobile station, which may be employed with aspects of the invention described herein.
Figure 10:
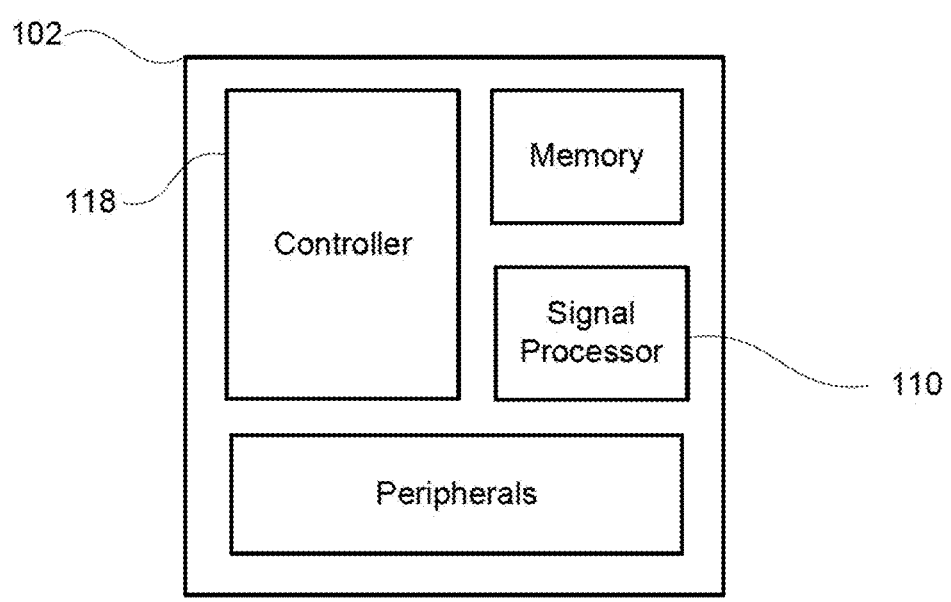
FIG. 10 illustrates a baseband subsystem for a wireless mobile station, which may be employed with aspects of the invention described herein.
Figure 11:
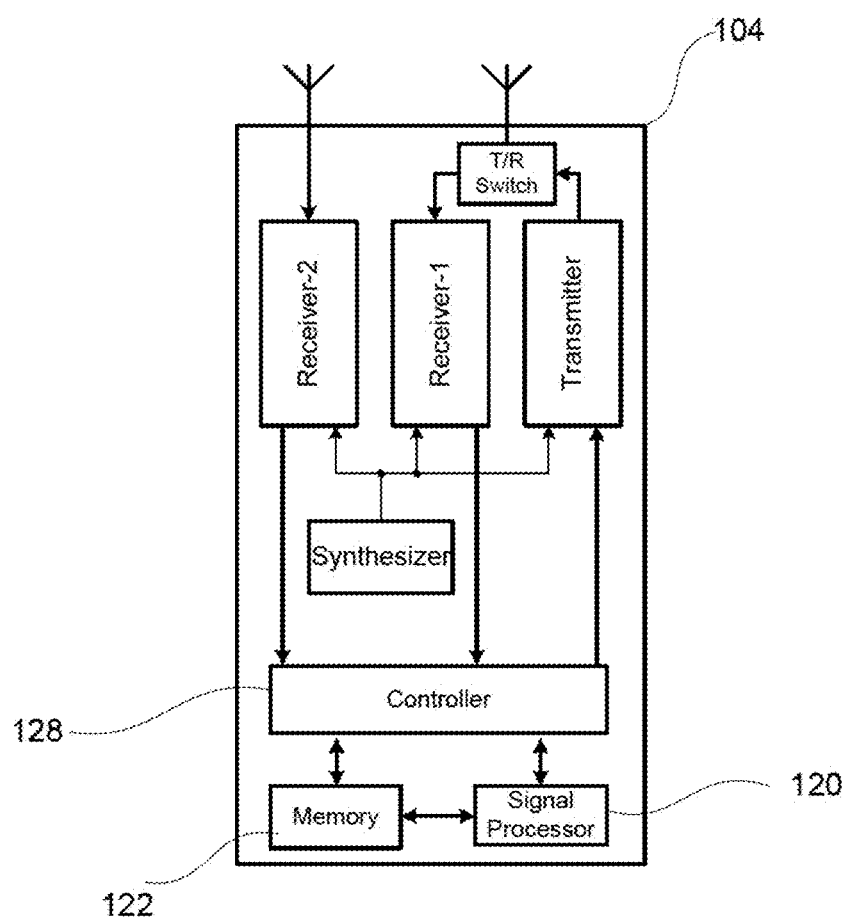
FIG. 11 illustrates an RF subsystem for a wireless mobile station, which may be employed with aspects of the invention described herein.

The application processor subsystem 101 as shown in FIG. 9 may include a controller 108 such as a microcontroller, other processor or circuitry. The baseband subsystem 102 as shown in FIG. 10 may include a controller 118 such as a microcontroller, other processor or circuitry. The RF subsystem 104 as shown in FIG. 11 may include a controller 128 such as a microcontroller, other processor or circuitry. The controller 108 desirably handles overall operation of the MS 100. This may be done by any combination of hardware, software and firmware running on the controller 108. Such combination of hardware, software and firmware may embody any methods in accordance with the aspects of the present invention.

In FIG. 10 the peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem as shown in FIG. 8. In another alternative, aspects of the present invention may also be implemented as a combination of firmware and hardware of the application processor subsystem 101 and/or the baseband subsystem 102. For instance, signal processing functionality of any or all of the FIG. 10 may be implemented in firmware and/or software, which is executed by the system hardware. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for wireless communication comprising:

controlling, by a processing device, receiving of system information (SI) based on information from a memory about a radio frame and subframe in which another SI is detected at a wireless communication device associated with the processing device a last time when the wireless communication device camped on a base station;

storing in the memory, by the processing device, a system frame number (SFN) in which a system information block (SIB) of the another SI is detected for the base station; and when SIB decoding for the base station is determined to be unsuccessful for a given system information block (SIB) according to a Presence Bitmap for the base station stored in the memory, controlling, by the processing device, updating the Presence Bitmap for the base station in accordance with a given SFN for which the SIB decoding of the given SIB is determined to be unsuccessful;

controlling, by the processing device, decoding of another SI message in at least one subframe corresponding to at least one bit set in a SI-subframebitmap.

2. The method of claim 1, wherein, when the processing device performs selection of, reselection of or handover to another base station and the memory indicates at least one system frame number (SFN) in which the wireless communication device detected a second system information block (SIB) when the wireless communication device previously camped on the another base station, the processing device controls decoding of the second SIB only in the at least one SFN.

3. The method of claim 1, wherein, when the processing device performs selection of, reselection of or handover to another base station and a second system frame number (SFN) in which the wireless communication device detected a second system information block (SIB) for the another base station is not indicated in the memory, the processing device controls decoding of the second SIB for the another base station in a plurality of SFNs for a most recent base station served by the wireless communication device indicated in the memory as a Presence Bitmap.

4. The method of claim 1, wherein the processing device controls turning off at least one subsystem of the wireless communication device for a subframe in a second system frame number (SFN) other than a second SFN indicated in the memory in which the wireless communication device is to decode a second system information block (SIB).

5. The method of claim 1, further comprising:

controlling, by the processing device, performing selection of, reselection of or handover to another base station, in which the memory indicates a bit map SI-subframebmp for at least one SI message detected in a previous camp on by the wireless communication device.

6. The method of claim 1, wherein the processing device controls turning off at least one subsystem of the wireless communication device for at least one subframe corresponding to at least one bit in a SI window not set in a SI-subframebmp indicated in the memory in which decoding of an SI message by the processing device is not controlled.

* * * * *